July 31, 1923.
A. D. MacLELLAN
PERCENTAGE FEEDER
Filed Feb. 17, 1922
1,463,777
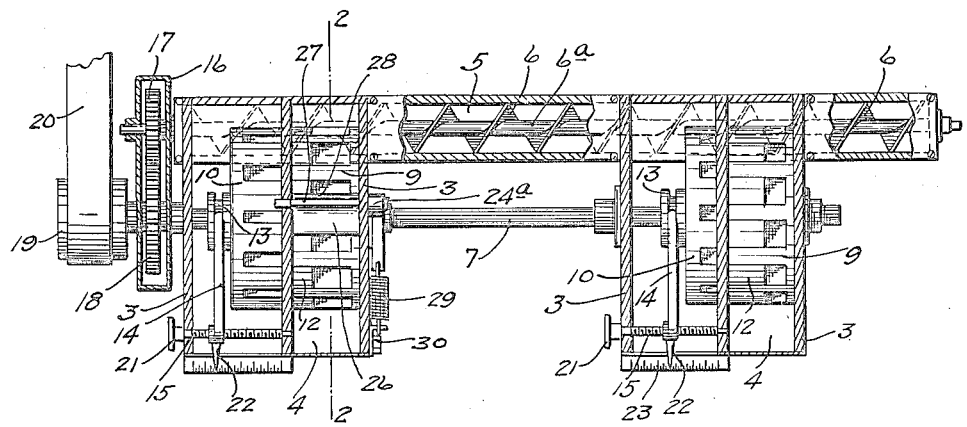
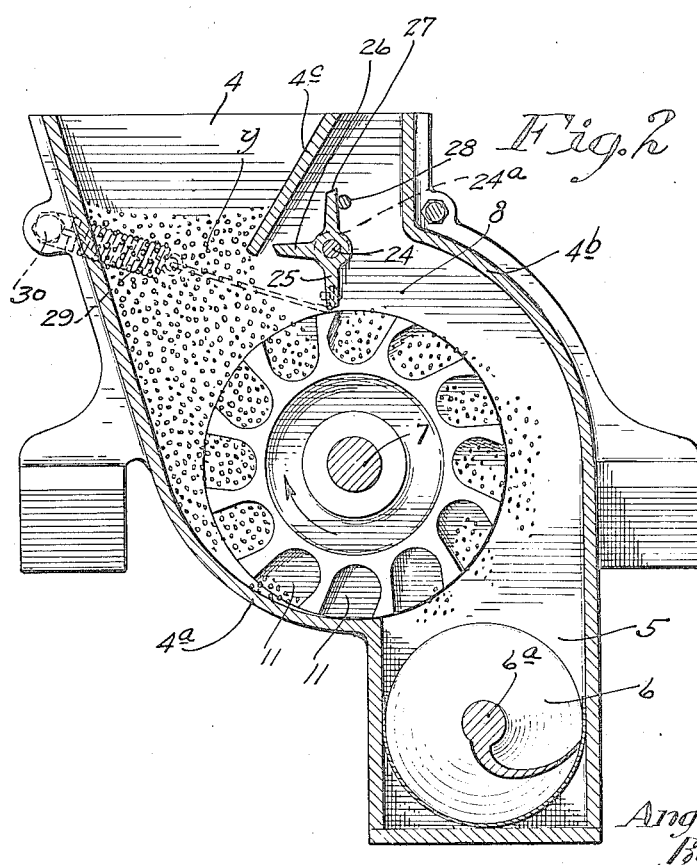
Inventor
Angus D. MacLellan
By his Attorneys
Merchant & Kilgore Patented July 31, 1923.

1,463,777

UNITED STATES PATENT OFFICE.

ANGUS D. MacLELLAN, OF OWENSBORO, KENTUCKY, ASSIGNOR TO MacLELLAN MIXER COMPANY, OF OWENSBORO, KENTUCKY, A CORPORATION OF KENTUCKY.

PERCENTAGE FEEDER.

Application filed February 17, 1922. Serial No. 537,213.

*To all whom it may concern:*

Be it known that I, ANGUS D. MACLELLAN, a citizen of the United States, residing at Owensboro, in the county of Daviess and State of Kentucky, have invented certain new and useful Improvements in Percentage Feeders; and I do hereby declare the following to be a full, clear, and exact description of the invention, such as will enable others skilled in the art to which it appertains to make and use the same.

Primarily, my invention has for its object the provision of an improved feeding mechanism of the character generally designated as a percentage feeder, and which percentage feeders include several independently adjustable feeding devices arranged to deliver, in predetermined but variable proportions, various different materials that are to be commingled to form a composite mass or aggregate mixture. However, the invention includes highly efficient feeding devices, which, per se, involve novelty and great utility.

Percentage feeders are highly desirable for many different purposes, such, for example, as commingling in predetermined desired proportions, different kinds of flour for producing blended flour, or different kinds of granular, pulverized or other materials for producing stock foods, but such feeders are, of course, adapted for much more general use.

In producing blended flour, stock foods and the like, it is highly important that the different materials or ingredients be fed together in exact predetermined portions, and, hence, that the feeding means be such that it may be set in advance to give exactly the desired set proportionate blend of the several materials. My invention provides such means and makes it an easy matter to definitely set the several feeding devices in advance for the desired predetermined blend or proportionate mixture, without any experiment and without making necessary subsequent tests to determine whether or not the desired blend is being produced.

In the accompanying drawings, which illustrate the invention, like characters indicate like parts throughout the several views.

Referring to the drawings:

Fig. 1 is a horizontal section taken through the feeder on several different lines, and some parts being shown in plan; and Fig. 2 is an enlarged section taken on the line 2—2 of Fig. 1, some parts being shown in full.

The numeral 3 indicates laterally spaced housings, each formed with feed hoppers 4 having laterally spaced parallel sides. The hoppers 4 have curved bottom plates $4^a$ that join with one side of a common transverse trough 5 in which works a spiral conveyor or feed screw 6. The numeral 7 indicates a main feed shaft that extends through both housings 3 and through both hoppers 4. The back plates $4^b$ of the hoppers are downwardly extended and join the other walls of the spout 5, and forward of the upper portions of said walls $4^a$, said hoppers are provided with inclined deflecting plates $4^c$ that afford open spaces 8 immediately above feed devices presently to be described.

The adjustable feed devices proper are made up of complemental cylindrical sections 9 and 10 that are carried by the shaft 7. The cylinder sections 9 are secured to said shaft and extend completely across the hoppers in which they are placed and are formed with circumferentially spaced feed pockets 11. These pockets 11 are of peculiar form in that they not only extend completely to one side of the cylinder section 9 and terminate somewhat short of the opposite sides thereof, but, in respect to the direction of rotation of the cylinder section, are inclined backward or obliquely, for an important reason which will presently appear. The cylinder sections 10 are formed with circumferentially spaced laterally projecting pocket-filling lugs 12 that snugly fit the several pockets 11 of the companion cylinder sections 9, but are adapted to be slid laterally therein, by lateral movements of the cylinder sections 10 on the shaft 7. Said cylinder sections 10 work in large close-fitting cylindrical openings in the adjacent side walls of the respective hoppers. As shown, the cylinder sections are shown as formed with grooved hubs 13 that are engaged by shipper levers 14 shown as mounted to slide on the guide rods 15 secured in the housings 3, but, of course, said movable cylinder sections 10 may be laterally adjusted in any suitable way. Those portions of the companion or complemental cylinder sections 9 and 10 that are telescoped or slid together present a smooth cylindrical exterior surface that will run through the flour or other material within the hopper without disturbing the same.

Obviously, by lateral adjustments of the cylinder sections 10, the holding capacity of the pockets 11 may be varied to any desired extent and at will, from nil to maximum length, and, of course, the feeding capacity of the two feeding devices may be thus varied at will and according to the desired proportion in which the different materials are to be fed to produce the desired blend. It will be understood that even when the cylinder sections 10 are given extreme outer adjustments so as to give maximum holding capacity to the pockets 11, their lugs 12 will not be withdrawn entirely from said pockets.

The shaft 6ª of the spiral conveyor 6 projects at one end into a fixed gear housing 16 and is provided therein with a gear 17 that meshes with a gear 18 carried by the shaft 11. One end of said shaft 7 is shown as provided with a pulley 19 over which runs a power-driven belt 20.

The guide rods 15 are preferably in the form of screws rotatively mounted in the hopper structures, having threaded engagement with the shipper levers 14 and are provided at their outer ends with operating knobs 21. Also, as shown, the levers 14 are provided with indicating fingers 22 that work over fixed scales 23 that serve to indicate the relative adjustments of the two feed devices and adapt the same to be readily set in advance for any desired proportionate blend of materials.

It may now be noted that the complemental cylinders that make up the feed devices, at their lower portions, are not in close contact with the lower parts of the curved bottoms 4ª of the co-operating hoppers and that the said curved bottoms converge forwardly and upwardly from such points of contact. It should also be here noted that the said feed devices rotate in the direction of the arrow marked thereon in Fig. 2.

Located in the spaces 8 immediately above the feed devices are automatic cut-off devices or yielding scrapers, each of which, as shown, comprises a rock shaft 24 having a depending primary scraper blade 25 and a supplemental scraper blade 26, which two blades project from each other at approximately ninety degrees. There may also be a third upwardly projecting scraper blade 27, which latter, as shown, normally engages a stop 28 on one side of the co-operating hopper. The rock shafts 24, at their outer ends, are provided with arms 24ª, which are connected to coiled springs 29 anchored at 30 to the outer sides of the co-operating hoppers. By reference to Fig. 2, it will be noted that the curved plates 4ᵇ of the hoppers are spaced far from the rotary feed devices made up of the complemental cylinders 9 and 10.

In Fig. 2, flour, or other ground or granular material, is indicated by the character $y$. This material, when fed into the hoppers 4 from the feed spout or other suitable source of supply, will fill the bottoms of said hoppers and run against the peripheral surface of the feed cylinders, and will have a tendency to fill the pockets 11, but under the action of gravity alone, would not do so with any degree of certainty. At this point, the importance of the arrangement of said pockets and of the hoppers should be noted.

By reference to Fig. 2, it will be seen that the bottoms of the hoppers extend to the bottoms of the cylinder sections and gradually converge therefrom in an upward direction. This prevents compacting of the material adjacent to the feed cylinders, so that the granular materials are freely run against the pocketed surface thereof. Because of the circumferentially oblique or backwardly inclined arrangement of said pockets, it will be seen that, as the pockets pass upward against the material in the hopper, there will be a scraping action that tends to fill the pockets and the disposition of the pockets permits the material to drop to the very bottoms thereof and completely fill said pockets. Moreover, this complete filling of the pockets is further resulted by the fact that said pockets pass through the material in the pockets while moving approximately from the lowermost to the uppermost portions of the cylinders.

The above described backward inclination of the pockets also facilitates the complete discharge of the material from the pockets and into the trough 5. Obviously, if the pockets were radially disposed, some of the material would be left in said pockets after said pockets have been moved against the lower cylindrical surface 4ª, and such carrying over of part of the material would not give the predetermined calculated blend, which is measured by the full carrying capacity of the pockets for any particular adjustment.

The feeding capacity of the pockets for different adjustments of the cylinder sections 10 may be predetermined or calculated and may be indicated on a scale so that, for example, it will only be necessary to set the levers 14 in positions indicated on the scales to adjust the machine for the desired blend.

The normal position of the automatic cut-off device illustrated is best shown in Fig. 2, wherein it will be noted that the lower edge of the primary scraper blade 25 is in close engagement with the upper surface of the rotary feed device and that the secondary blade 26 is horizontally projected toward the deflecting plate or inset hopper plate 4ᶜ, so that the two blades positively prevent the grain or material $y$ from being carried from the hopper except as it enters the pockets of the feed device. This automatic cut-off or yielding scraper is very important for many purposes and especially so where the commodity or granular material has to be "scalped" and where it may contain foreign materials, such as nails, small pieces of rock or the like, which, if caught between the edge of a pocket and an unyielding scraper or side wall, would either cause breakage of the parts or stopping of the machine. This yielding device, when nails or the like are caught between the same and the feed device, will yield and move, thereby permitting such nail or the like to be carried on through without doing any damage. When the cut-off device is thus moved, the supplemental blade 26 moves downward to take the place of the onwardly moved scraper blade 25, and if such movement is great, the third plate 27 will come into position. At any rate, the blades 26 and 27 prevent the grain from running on through while the blade 25 is temporarily moved from position. Of course, as soon as the nail or other obstruction is carried past the blade 25, the spring 29 will quickly return the automatic cut-off device to its normal position shown in Fig. 2.

It will be understood that the drawings illustrate only one of the many different arrangements in which the feed devices may be connected. As a matter of fact, for the blending of flour, stock food and many other things, a much larger number than two of the independently adjustable feeding devices will be provided.

What I claim is:

1. In a feeder of the class described, the combination of a pair of spaced hoppers, a trough connecting said hoppers, a shaft extending transversely through said hoppers, cylindrical sections having complemental ribs and oblique pockets mounted on said shaft in each of said hoppers, said rib sections being movable relative to the pocket sections, a guide rod journalled in each of said hoppers, a lever secured to said rod and engaging the rib sections for varying the width of said pockets, and means in said trough for commingling the stock as it issues from said hoppers.

2. In a feeder of the class described, the combination of a pair of fixed hoppers, a trough connecting said hoppers, a shaft extending transversely through said hoppers, cylindrical sections having complemental ribs and oblique pockets mounted on said shaft in each of said hoppers, said rib sections being movable relative to the pocket sections, a guide rod journalled in each of said hoppers, a lever adjustably secured to said rod and engaging the rib sections for varying the width of said pockets, an indicating scale projecting from the forward end of said hoppers adjacent said guide rod, and means in said trough for commingling the stock as it issues from said hoppers.

3. The combination with a hopper and a rotary pocketed feed cylinder, of a co-operating yieldingly held scraper having blades, one of which normally lies close to the periphery of said feed cylinder and the other of which is positioned to move downward when said first blade is moved rearward, and means for returning the blades to their normal position.

4. The combination with a casing comprising a hopper and having a discharge passage, of a pocketed feed cylinder working in said casing between said hopper and discharge passage, said hoppers having a deflecting plate spaced from said feed cylinder and affording a clear space in the upper portion of said casing, of a yieldingly pressed scraper mounted in said clear space and having a plurality of radially projecting blades, one of which normally lies close to said feed cylinder and another of which is movable downward toward said cylinder when the first blade moves from normal position and the said yielding scraper affording an automatic cut-off between said cylinder and deflecting plate.

5. The combination with a casing comprising a hopper, of a pocketed feed cylinder working in said casing adjacent to said hopper, said hopper having a deflecting plate spaced from said cylinder, and a spring-pressed scraper operating as an automatic cut-off between said cylinder and deflecting plate and having three angularly spaced blades, one of which normally lies close to said cylinder, means for limiting the movement of the scraper in one direction, and means for returning the blades to their normal position.

6. In a feeder of the class described the combination with a pair of fixed hoppers, a trough connecting said hoppers, cylinder sections having complemental ribs and pockets journalled in each of said hoppers, a yieldable scraper journalled in each of said hoppers, said scraper having angularly extending blades, one of which normally contacts with the periphery of said cylinder, and the other of which is adapted to move downward when the first blade is moved rearward and close the space above the cylinder, means for returning the blades to their normal position, and means in said trough for mixing the stock as it issues from said hopper.

7. In a feeder of the class described the combination with a pair of fixed hoppers, a trough connecting said hoppers, cylinder sections having complemental ribs and pockets journalled in each of said hoppers, a yieldable scraper journalled in each of said hoppers, said scraper having a plurality of angularly extending blades, one of which normally contacts with the periphery of said cylinder and the other of which is adapted to move downward when the plate has moved rearward and close the space above the cylinder, means limiting the movement of the blades in one direction, resilient means connected to said hoppers for returning the blades to their normal position, and means in said trough for mixing the stock as it issues from said hoppers.

In testimony whereof I affix my signature.

ANGUS D. MacLELLAN.